Aug. 19, 1941.  C. M. TUTTLE ET AL  2,253,055
EXPOSURE CONTROL APPARATUS
Filed March 15, 1940

CLIFTON M. TUTTLE
ALLAN M. KOERNER
INVENTORS

BY
ATTORNEYS

Patented Aug. 19, 1941

2,253,055

UNITED STATES PATENT OFFICE 2,253,055

EXPOSURE CONTROL APPARATUS

Clifton M. Tuttle and Allan M. Koerner, Rochester, N. Y., assignors to Eastman Kodak Company, Rochester, N. Y., a corporation of New Jersey Application March 15, 1940, Serial No. 324,231

3 Claims. (Cl. 88—24)

The present invention relates to photographic apparatus and particularly to apparatus for governing the length of a time interval in accordance with the illumination of a subject being photographed.

In making photographic exposures of considerable length such as are required in process work, inconstant artificial light sources, such as arc lamps, are generally employed. Under these circumstances a measure of the time of exposure fails as a measure of total exposure.

It is an object of this invention to minimize the difficulty arising from intensity variation during an exposure period by providing apparatus for regulating the exposure period substantially in accordance with the average intensity Another object of the invention is to provide apparatus which controls the length of an exposure in accordance with the summation of a plurality of uniform periods multiplied by the intensity for each of said periods whereby the length of the exposure is determined by the number of said periods necessary for obtaining the quantum of light required for correct exposure.

Figure 1:
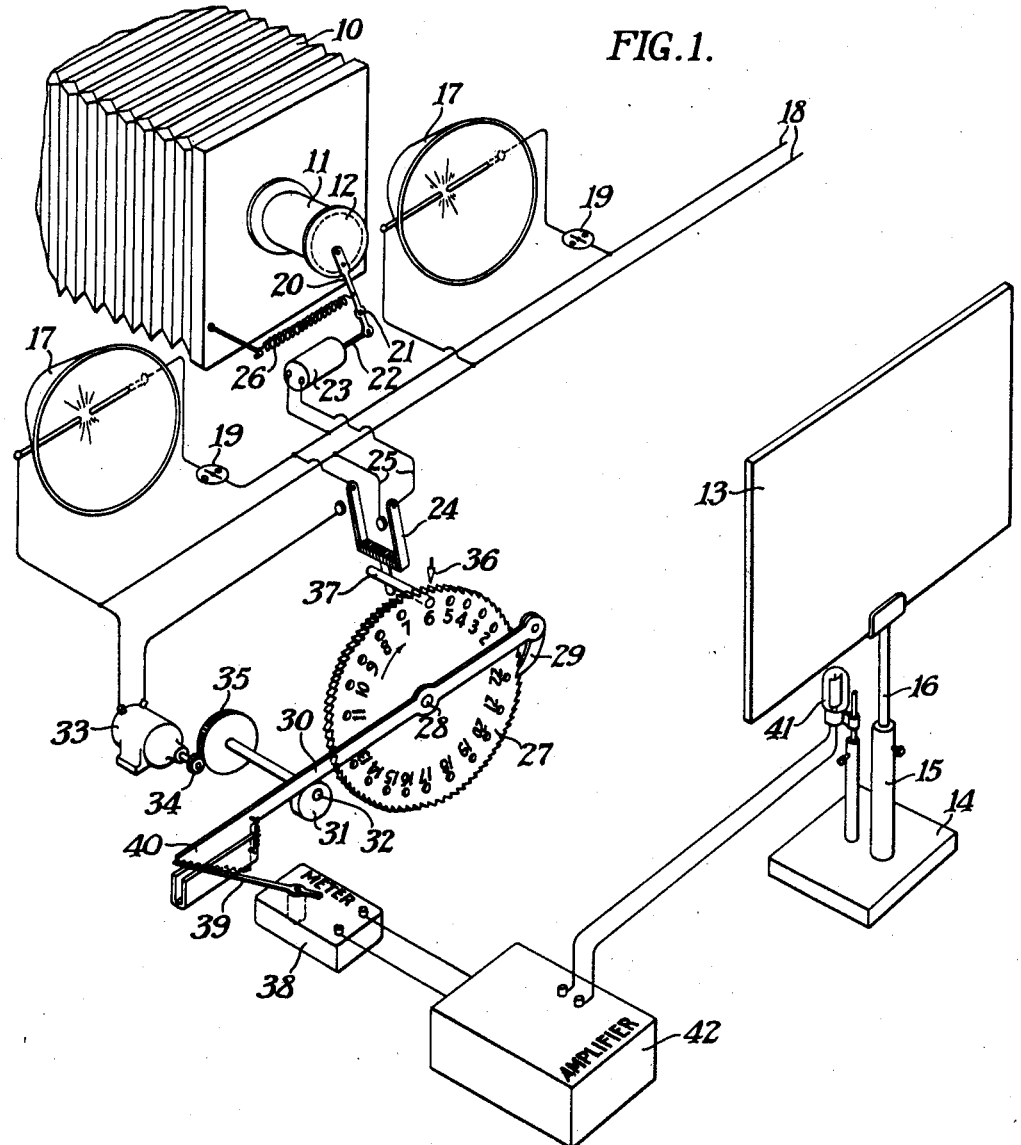
Figure 2:
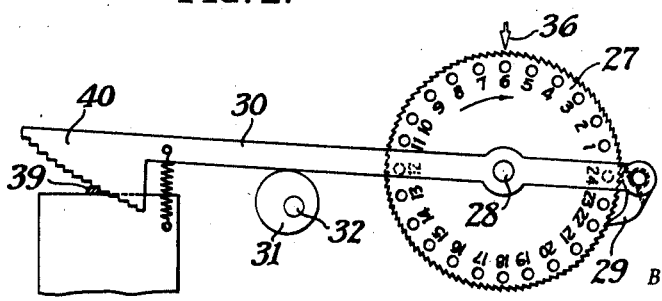

Other objects and advantages of the invention will become evident to those skilled in the art from a reading of the following specification in connection with the accompanying drawing in which, Fig. 1 is a diagrammatic perspective view of an arrangement embodying the invention as applied to a process camera; and Fig. 2 is a front elevation of an indexing means shown in Fig. 1.

According to the invention, at periodic intervals during an exposure to be regulated, a light sensitive means samples the illumination or other factor bearing a known relation to the exposing light and during each such interval the exposure is proportionally lengthened or shortened in accordance with the value of the illumination or other factor at the time the sample is taken. Thus, although all variations in illumination or other factors are not exactly followed, it has been found that a large number of uniformly spaced samples each accompanied by the required correction is sufficiently representative of the exposure history to give satisfactory results.

In the drawing one form of the invention is shown as applied to a copying camera 10 such as is normally used in process work. The camera 10 has the usual lens tube 11 covered by a cap 12 which is removable for making an exposure. A suitable copy board 13 supported on a base 14 by telescoping members 15 and 16 is adapted in any well known manner to hold material to be copied and may be illuminated by lamps 17. The lamps 17, here shown as the arc type, are adapted to be suitably energized as by being connected in parallel across leads 18 which may be energized by any suitable source not shown. If desired, the lamps 17 may each be provided with circuit making and breaking means 19.

The lens cap 12 is carried on one end of an arm 20 pivoted at 21 and having its other end connected to the armature 22 of a solenoid 23 which is adapted to be connected to the line 18 by a switch 24 and through leads 25. When the switch 24 is closed to energize the solenoid 23, the arm 20 is moved against the bias of a spring 26 to move the cap 12 from in front of the lens tube 11 thereby starting an exposure.

For determining the length of the exposure the following arrangement is employed. A toothed disc 27 mounted for rotation about an axle 28 is adapted to be indexed in a clockwise direction by a pawl 29 carried by an oscillatable arm 30 which is pivoted on the axle 28. The arm 30 is periodically rocked as by an eccentric roller 31 secured to a shaft 32 which is rotated at a uniform speed by a motor 33 driven through gears 34 and 35. The constant speed driven motor 33 may be an electric synchronous motor connected to the lines 18 through the switch 24 so that the rocking movement of the arm 30 is commenced when the switch 24 is moved to closed position to start the exposure. If the amplitude of the rocking movement of the arm 30 was constant, the pawl 29 would index the disc 27 through the same angle for every oscillation and a predetermined angular movement of the disc 27 would always correspond to a fixed time interval. Thus, if a certain point such as zero on the disc 27 is placed opposite an index mark 36 when the switch 24 is closed, a predetermined time interval will have elapsed when the part of the disc 27 carrying the numeral 6 comes opposite the index 36 and if some means is provided, such as a pin 37, to open the switch 24 when the disc has moved this amount, the solenoid 23 will be de-energized and the spring 26 will force the cap back to the position shown in Fig. 1 at which the exposure is terminated.

In making relatively long exposures, the illumination of the subject carried by the board 13 is likely to vary and a fixed time of exposure will not necessarily result in a correct exposure. Therefore, it is desirable to shorten or lengthen the exposure interval to compensate for any such variations in the illumination. This may be done by making the indexing movement of the disc 27 by the pawl 29 depend upon the illumination and in the embodiment of the invention shown in the drawing, this is accomplished by providing a meter 38 with a pointer 39 movable in the path of a notched scimitar blade 40 provided at the end of the rocking arm 30. The meter 38 is energized in accordance with the illumination of the copy board 13 by means of a photoelectric cell 41 acting through an amplifier 42. It will thus be seen that, depending upon the position of the meter pointer 39, the extent of the rocking movement of the arm 30 is limited and the arrangement is such that an increase or decrease of the illumination from what may be considered normal results in a corresponding increase or decrease, respectively, of the rocking movement of the arm 30 and, therefore, in the angle through which the disc 27 is indexed.

With the arrangement above described, if it is found that an angular movement of the disc 27 from zero to 6 gives correct exposure for normal illumination, then, if during the exposure the illumination varies, the corresponding variation introduced into the amplitude of the oscillating arm 30 by the meter pointer 39 will result in a corresponding change in the time interval to give a proper exposure. It will be understood that the speed of rotation of the eccentric disc 31 will be high enough to insure that a relatively large number of oscillations of the arm 30 will take place during a single exposure to the end that enough samples of the illumination will be taken to make it reasonably certain that any variations in illumination will have been followed with sufficient accuracy to give satisfactory results.

While the specific embodiment of the invention has been described in detail to make it clear to those skilled in the art, many modifications will readily suggest themselves and all such modifications are intended to be included in the appended claims.

What we claim and desire to be secured by Letters Patent of the United States is:

1. In photographic copying apparatus requiring relatively long exposures, means for illuminating the subject being copied, means for initiating an exposure, light sensitive means for providing an electric current proportional to and variable with the illumination of the subject, a ratchet disc, an oscillatable arm, a pawl carried by said arm for indexing said disc in accordance with the amplitude of oscillation of said arm, means for oscillating said arm at a uniform relatively high frequency, means for simultaneously actuating said exposure initiating means and said arm oscillating means, means controlled by said current for governing individually the amplitude of each oscillation, whereby the time required for indexing said disc a predetermined amount will depend substantially upon the average intensity of the illumination of the subject, exposure terminating means, and means responsive to a predetermined amount of indexing of said disc for actuating the exposure terminating means.

2. Means for providing a time interval corresponding to the average intensity of illumination comprising means movable through a path of predetermined length for providing the time interval, a rocker arm for indexing the movable means along said path, means for rocking said arm periodically, and means for governing the extent of each such rocking movement in accordance with the intensity of the illumination existing during the period between each rocking movement.

3. In apparatus for regulating the length of a photographic exposure of relatively long duration the combination of means for translating variations of light intensity into distance increments comprising means for producing periodic increments of variable size, means for controlling the size of each of said increments in accordance with the intensity of the exposure taking place, and means for terminating the exposure when said increments total a predetermined distance.

CLIFTON M. TUTTLE.
ALLAN M. KOERNER.